United States Patent [19]

Honjo

[11] Patent Number: 5,191,433
[45] Date of Patent: Mar. 2, 1993

[54] CONTROLLING THE PHASE OF A FREQUENCY-MODULATED WAVE SO AS TO BE IN A PREDETERMINED PHASE RELATIONSHIP WITH A VIDEO SIGNAL

[75] Inventor: Masahiro Honjo, Neyagawa, Japan

[73] Assignee: Matsushita Electric Industrial Co., Ltd., Osaka, Japan

[21] Appl. No.: 497,599

[22] Filed: Mar. 23, 1990

[30] Foreign Application Priority Data

Mar. 24, 1989 [JP] Japan .................................. 1-72416

[51] Int. Cl.⁵ .................................................. H04N 5/76
[52] U.S. Cl. .................................... 358/335; 358/336; 358/340; 358/330
[58] Field of Search ............... 358/310, 335, 336, 340, 358/330

[56] References Cited

U.S. PATENT DOCUMENTS 4,245,262 1/1981 Ohtsu .............................. 358/314 X
4,763,206 8/1988 Takahashi et al. ...................... 360/8

FOREIGN PATENT DOCUMENTS 53-9507 1/1978 Japan .

Primary Examiner—Robert L. Richardson
Attorney, Agent, or Firm—Wenderoth, Lind & Ponack

[57] ABSTRACT

A video tape recorder wherein when a video signal is frequency-modulated, the phase of a frequency-modulated wave is in a predetermined phase relationship with respect to the video signal. The frequency modulator is driven so that the video signal is time-base compressed to form a space of time. Then, a non-video signal is inserted into the space of time, and the frequency-modulated wave is brought into a predetermined phase having a synchronous relationship with the video signal. Furthermore, in another arrangement, during the reproducing operation, a regenerative demodulated signal is time-base expanded in order to avoid outputting noise due to the discontinuity in phase of the frequency-modulated wave which has arisen within the non-video signal contained space of the regenerated demodulated signal.

2 Claims, 3 Drawing Sheets

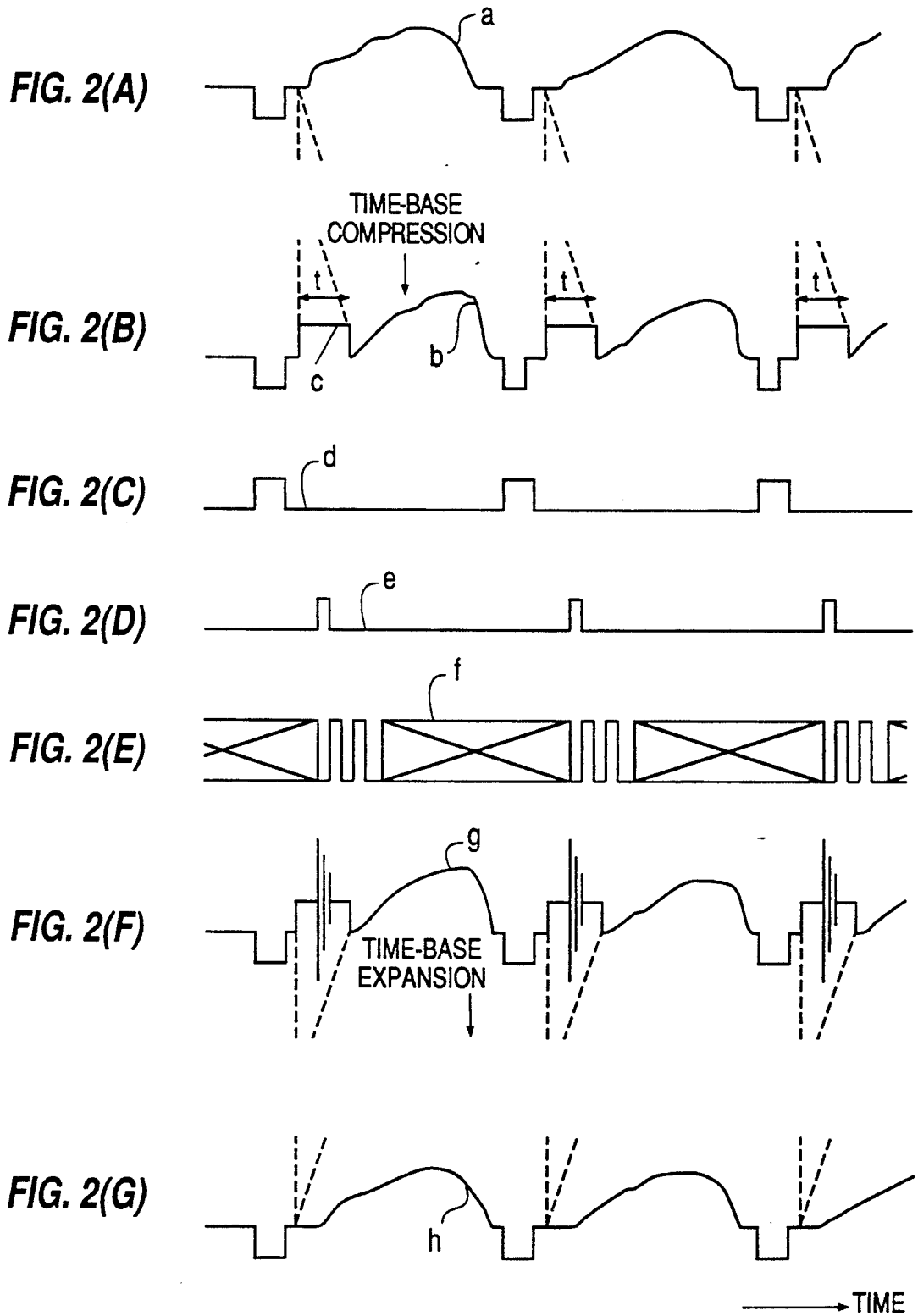

CONTROLLING THE PHASE OF A FREQUENCY-MODULATED WAVE SO AS TO BE IN A PREDETERMINED PHASE RELATIONSHIP WITH A VIDEO SIGNAL

BACKGROUND OF THE INVENTION

1. Field of the Invention

The present invention relates to a video tape recorder arranged such that when a video signal is frequency-modulated, the phase of a frequency-modulated wave is in predetermined phase relationship with respect to the video signal.

2. Description of the Prior Art

Prior Art Japanese Patent Publication No. 53-9507 discloses that the interleaving of crosstalk from adjacent tracks is achieved by maintaining a predetermined relationship between the phase of the frequency-modulated wave and the input video signal. However, if a frequency modulator is forced into being reset when the frequency-modulated wave is put in a predetermined phase, the frequency-modulated wave will become discontinuous, so that a noise spike may be produced at the time when the frequency-demodulation takes place.

Conventionally, such resultant spike noise would be subjected to a muting process. But this may cause a partial dropout of the spike noise at the time of the subsequent muting operation.

That is, there lies a problem in that control of the frequency modulated wave to place it in any desired phase will lead to the partial dropout of demodulated video signals.

SUMMARY OF THE INVENTION

According to the present invention, there is provided an arrangement that when the video signal is frequency-modulated, the frequency modulator is driven so that the video signal is time-base compressed to form a space of time; then, a non-video signal is inserted into said space of time and the frequency-modulated signal is placed into a predetermined phase having a synchronous relationship with the video signal. Furthermore, another arrangement in accordance with the present invention is that by time-base expanding a frequency-demodulated signal, noise due to a discontinuity in phase of a frequency-modulated wave which has been generated by the frequency-demodulated signal within the non-video signal contained space can be eliminated.

The described arrangement makes it possible to effectively control the frequency-demodulated wave so as to place it in any desired phase without consequential dropout of the video signals.

BRIEF DESCRIPTION OF THE DRAWINGS

FIGS. 2(A)-2(G) are waveforms of the respective parts of FIG. 1, and

DESCRIPTION OF THE PREFERRED EMBODIMENTS

Figure 1A:
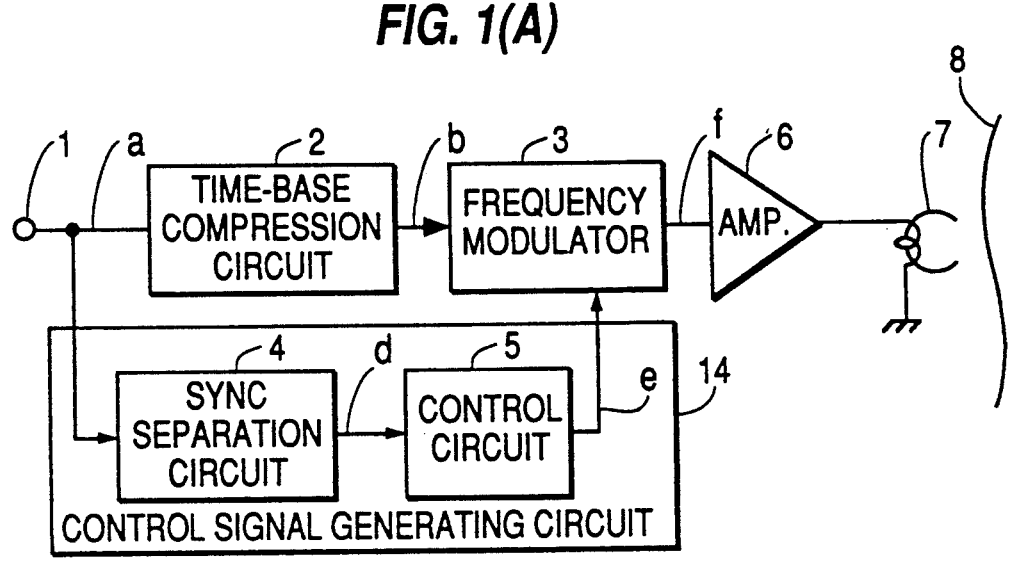
FIGS. 1(a) and 1(b) are block diagrams of a video tape recorder in accordance with the present invention.
Figure 1B:
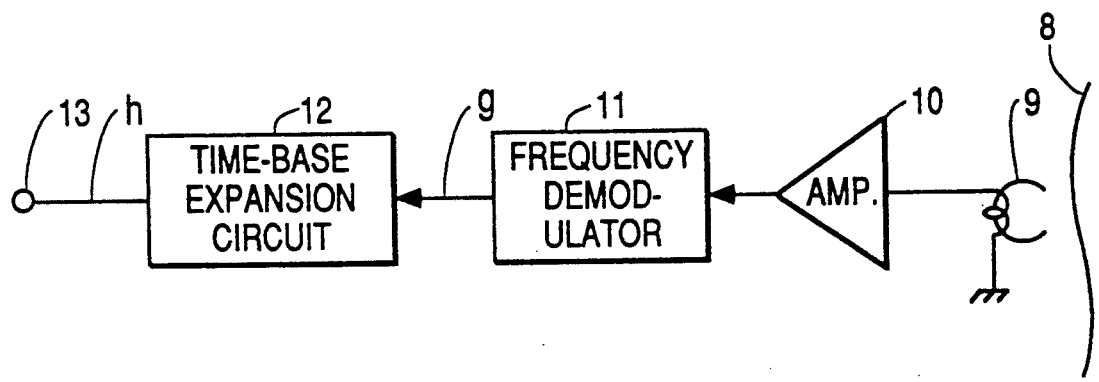

FIGS. 1(a)-1(b) are a block diagram of a video tape recorder of the present invention, in which FIG. 1(a) shows a recording system, and FIG. 1(b) shows a reproducing system. The waveforms of the respective parts shown in FIGS. 1(a)-1(b) are illustrated in FIGS. 2(A-)-2(G). An input video signal a from a terminal 1 is time-base compressed at a time-base compression circuit 2 to change it into a signal b. At this time, for example, a non-video signal c of a certain pattern is inserted into an area t of a space of time.

In a control signal generating circuit 14, a horizontal synchronizing signal d is separated from the input video signal a by a synchronizing separation circuit 4, and in a control circuit 5, a control signal e is formed with reference to a signal d. This control signal e will be an input signal from the control signal generating circuit 14.

Since the phase of a frequency modulator 3 is forcibly reset to a certain phase by means of the control signal e, a frequency-modulated wave will be in the form of a signal f. This signal f is recorded on a recording tape 8 by a head 7 via a recording amplifier 6.

During reproduction, a signal reproduced by a head 9 is passed through a head amplifier 10 to reach a frequency demodulator 11, where said signal will be frequency-demodulated to obtain a regenerated demodulated signal g. The signal g here tends to produce a big spike noise at the FM discontinuity as shown in FIG. 2 (F). The signal g is time-base expanded only t its video signal part in a time-base expansion circuit 12, and then outputted to a terminal 13 as a signal h. That is, the noise spike is prevented from being transmitted to the terminal 13.

Figure 3:
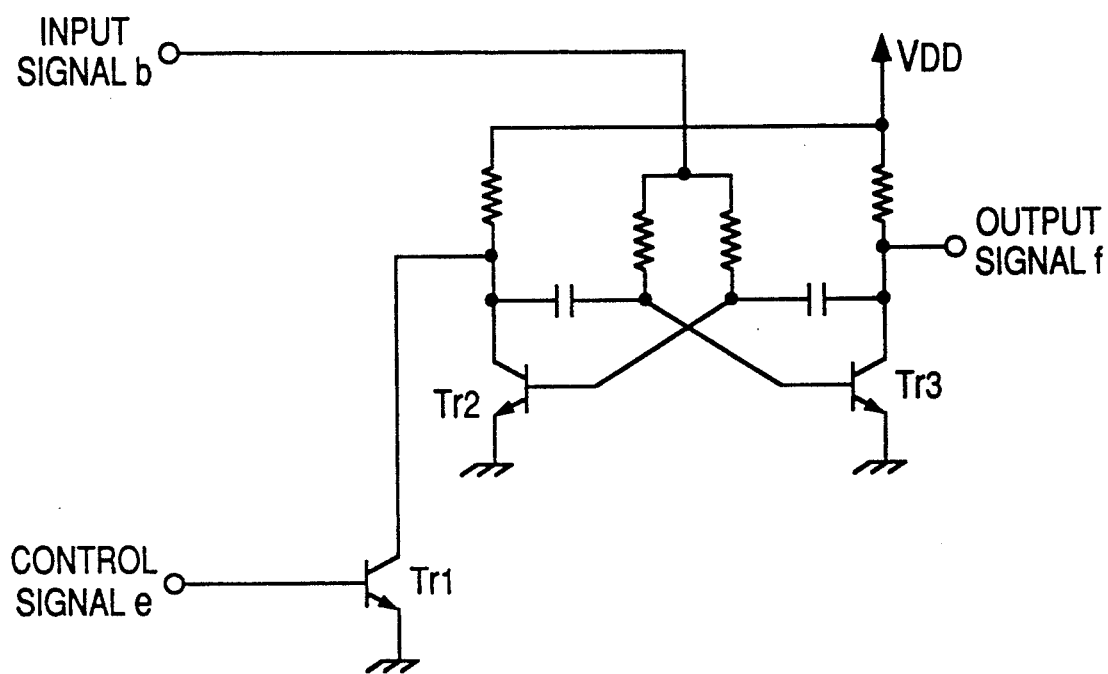
FIG. 3 is one example of the modulator circuit in accordance with the present invention.

One embodiment of the frequency modulator 3 is shown in FIG. 3. This modulator has an additional transistor Tr1 disposed in the circuit thereof, so that when the transistor Tr1 allows the entry of the control signal e into its base, the collector of a transistor Tr2 will be forced to be grounded for phase resetting.

The input video signal a may be a luminance signal or a color difference signal, or a time-base multiplex signal resulting from the multiplexing of the luminance signal with the color difference signal in the described embodiment.

In the drawing, the area t is shown provided right behind the synchronizing signal of the input video signal, but the area t may be placed right before the synchronizing signal.

Though the description was made to indicate that the area t is to receive the signal c of a certain level, the insertion of any signal other than the video signal into said area will never deviate from the scope of the present invention; for example, it does not matter if it is, for example, a signal produced within the video tape recording, such as a synchronizing signal or burst signal for use in the reproduction operation of the VCR.

Additionally, for bringing the frequency-modulated wave into synchronization with a horizontal synchronizing signal to keep a constant phase at all times, for example, a single monostablemultivibrator can serve within the control circuit 5.

If the frequency-modulated wave needs to change in phase depending on 1 H (H: horizontal sync interval) or each track, the control signal e must be slightly changed for some period of time in response to the change of the phase, and the control circuit 5 will necessarily have added structures accordingly, which, however, will be within the scope of the present invention.

I claim:

1. A video signal recording apparatus comprising:
   a means for time-compressing an input video signal and for time-division multiplexing the time-compressed video signal with a predetermined signal to obtain a multiplexed signal in which the predetermined signal occurs periodically;

a control signal generating means for receiving said input video signal and for generating a control signal which is a pulse signal occurring in a time period in which the predetermined signal occurs in the multiplexed signal;

a frequency-modulating means for frequency-modulating the multiplexed signal to obtain a frequency-modulated signal, including a means responsive to said control signal for resetting said frequency-modulating means in the time period in which the predetermined signal occurs in the muliplexed signal so that said frequency-modulated signal is in phase with the input video signal; and a recording means for recording the frequency-modulated signal on a recording medium.

2. A video signal recording and reproducing apparatus comprising:

a means for time-compressing an input video signal and for time-division multiplexing the time-compressed video signal with a predetermined signal to obtain a multiplexed signal in which the predetermined signal occurs periodically;

a control signal generating means for receiving said input video signal and for generating a control signal which is a pulse signal occurring in a time period in which the predetermined signal occurs in the multiplexed signal;

a frequency-modulating means for frequency-modulating the multiplexed signal to obtain a frequency-modulated signal, including a means responsive to said control signal for resetting said frequency-modulating means in the time period in which the predetermined signal occurs in the multiplexed signal so that said frequency-modulated signal is in phase with the input video signal;

a recording and reproducing means for recording the frequency-modulating signal on a recording medium and for reproducing the recorded frequency-modulated signal from the recording medium to obtain a reproduced frequency-modulated signal;

a frequency-demodulating means for demodulating the reproduced frequency-modulated signal to obtain a reproduced multiplexed signal in which the time-compressed video signal and the predetermined signal are time-division multiplexed; and a means for demultiplexing the reproduced multiplexed signal to obtain a reproduced time-compressed video signal and for time-expanding the reproduced time-compressed video signal to obtain a reproduced video signal.

* * * * *